United States Patent
Shimasaki et al.

(10) Patent No.: US 9,944,161 B2
(45) Date of Patent: Apr. 17, 2018

(54) VEHICLE REAR PORTION STRUCTURE

(71) Applicant: TOYOTA JIDOSHA KABUSHIKI KAISHA, Toyota-shi, Aichi-ken (JP)

(72) Inventors: Osamu Shimasaki, Nisshin (JP); Hiroshi Amano, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/341,785

(22) Filed: Nov. 2, 2016

(65) Prior Publication Data
US 2017/0182874 A1 Jun. 29, 2017

(30) Foreign Application Priority Data
Dec. 24, 2015 (JP) ................... 2015-251930

(51) Int. Cl.
*B60K 1/04* (2006.01)
*B62D 25/08* (2006.01)
*H01M 2/10* (2006.01)

(52) U.S. Cl.
CPC ............... *B60K 1/04* (2013.01); *B62D 25/08* (2013.01); *H01M 2/1077* (2013.01); *H01M 2/1083* (2013.01); *B60K 2001/0416* (2013.01)

(58) Field of Classification Search
CPC .. B60K 1/04; B60K 6/40; B60K 6/405; B60S 5/06
See application file for complete search history.

(56) References Cited

U.S. PATENT DOCUMENTS

| | | | |
|---|---|---|---|
| 3,557,895 A | 1/1971 | Thomas | |
| 3,866,704 A | 2/1975 | Bowers et al. | |
| 4,520,887 A | 6/1985 | DiFazio | |
| 8,622,161 B2 * | 1/2014 | Hara | B62D 43/10 180/65.31 |
| 2011/0000729 A1 | 1/2011 | Schwarz et al. | |

FOREIGN PATENT DOCUMENTS

| | | |
|---|---|---|
| JP | 2007-161075 A | 6/2007 |
| JP | 2014-129042 A | 7/2014 |
| JP | 2015-096353 A | 5/2015 |

* cited by examiner

Primary Examiner — John D Walters
Assistant Examiner — James J Triggs
(74) Attorney, Agent, or Firm — Oliff PLC

(57) ABSTRACT

A vehicle rear portion structure includes: a vehicle rear floor having a low floor portion, a high floor portion that is placed on a vehicle rear side and a vehicle upper side of the low floor portion, and a step wall portion that interconnects a rear end portion at the vehicle rear side of the low floor portion and a front end portion at a vehicle front side of the high floor portion; a battery tray that is placed on the low floor portion, is joined to the low floor portion, and is configured to support a battery; and a reinforcement member that extends from the battery tray to the high floor portion and is joined to the high floor portion.

12 Claims, 6 Drawing Sheets

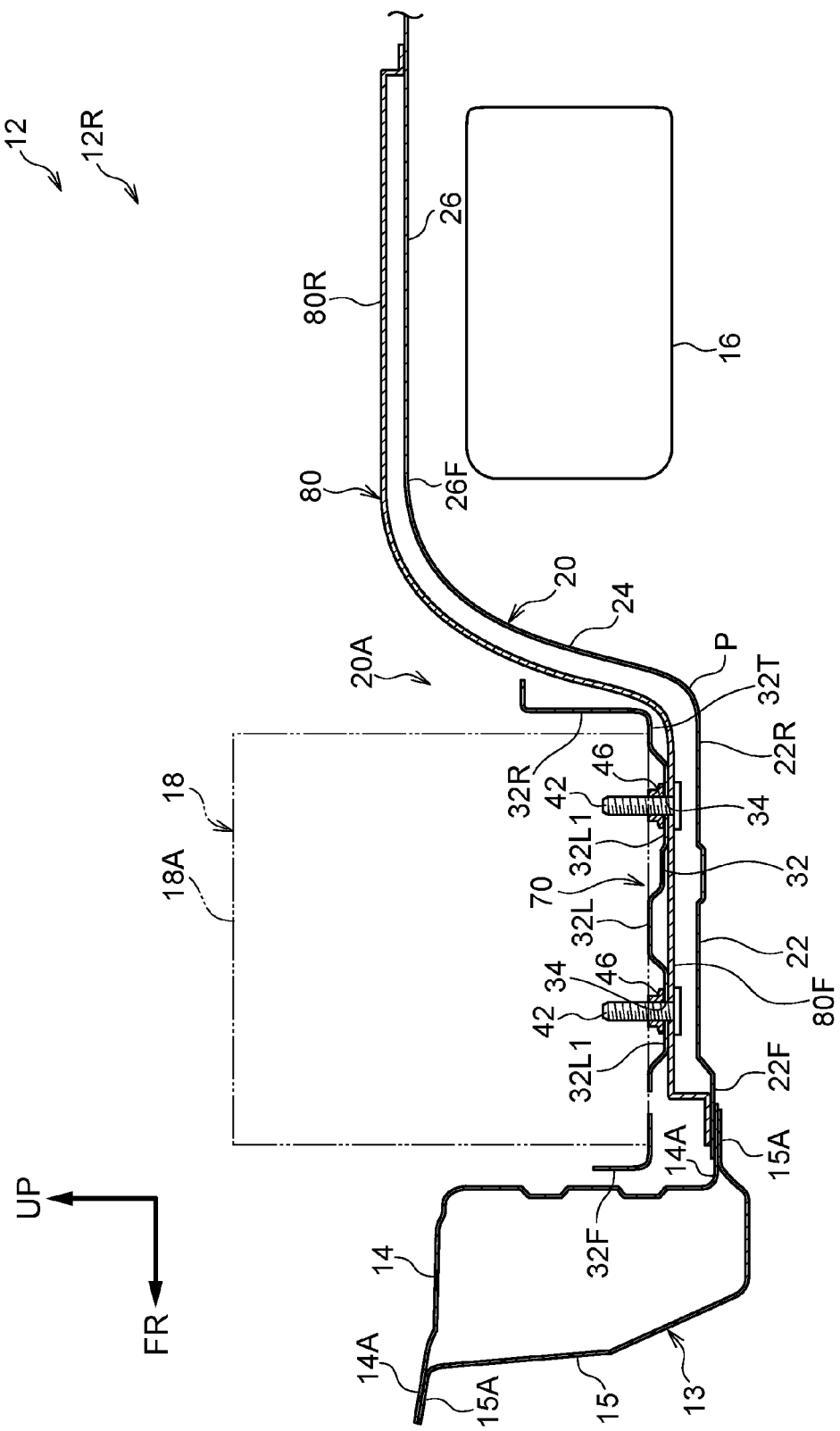

VEHICLE REAR PORTION STRUCTURE

CROSS-REFERENCE TO RELATED APPLICATION

This application is based on and claims priority under 35 USC 119 from Japanese Patent Application No. 2015-251930 filed on Dec. 24, 2015, the disclosure of which is incorporated by reference herein.

BACKGROUND

Technical Field

The present disclosure relates to a vehicle rear portion structure.

Related Art

There is a vehicle rear portion structure equipped with a vehicle rear floor and a battery, which is housed in a recessed portion formed in the vehicle rear floor (e.g., see Japanese Patent Application Laid-open (JP-A) No. 2007-161075).

Furthermore, as an example of a technology relating to a vehicle rear portion structure, there is the technology disclosed in JP-A No. 2015-096353.

SUMMARY

In connection with a vehicle rear floor having a low floor portion, a high floor portion that is placed on the vehicle rear side and the vehicle upper side of the low floor portion, and a step wall portion that interconnects the low floor portion and the high floor portion, it is conceivable to install the battery on the low floor portion.

However, if the battery is installed on the low floor portion of the vehicle rear floor, in a case where, for example, the vehicle rear floor vibrates in the vehicle vertical direction as the vehicle travels, the displacement (amplitude) of the boundary portion between the low floor portion and the step wall portion tends to become large, and there is the potential for stress to concentrate in the boundary portion.

Therefore, it is an object of the present disclosure to obtain a vehicle rear portion structure that can restrain stress from concentrating in the boundary portion between the low floor portion and the step wall portion as the vehicle rear floor vibrates in the vehicle vertical direction.

A vehicle rear portion structure pertaining to a first aspect includes: a vehicle rear floor having a low floor portion, a high floor portion that is placed on a vehicle rear side and a vehicle upper side of the low floor portion, and a step wall portion that interconnects a rear end portion at the vehicle rear side of the low floor portion and a front end portion at a vehicle front side of the high floor portion; a battery tray that is placed on the low floor portion, is joined to the low floor portion, and is configured to support a battery; and a reinforcement member that extends from the battery tray to the high floor portion and is joined to the high floor portion.

According to the vehicle rear portion structure pertaining to the first aspect, the battery tray that supports the battery is placed on the low floor portion of the vehicle rear floor. The battery tray is joined to the low floor portion. Furthermore, the reinforcement member extends from the battery tray to the high floor portion. The reinforcement member is joined to the high floor portion.

Here, because the reinforcement member that extends from the battery tray is joined to the high floor portion, the vehicle vertical direction rigidity of the boundary portion between the low floor portion and the step wall portion is enhanced. Because of this, in a case where, for example, the vehicle rear floor vibrates in the vehicle vertical direction as the vehicle travels, the displacement (amplitude) of the boundary portion between the low floor portion and the step wall portion is reduced. Consequently, stress can be restrained from concentrating in the boundary portion between the low floor portion and the step wall portion as the vehicle rear floor vibrates in the vehicle vertical direction.

A vehicle rear portion structure pertaining to a second aspect is the vehicle rear portion structure pertaining to the first aspect, wherein the reinforcement member extends from a rear end portion at the vehicle rear side of the battery tray along the step wall portion to the high floor portion.

According to the vehicle rear portion structure pertaining to the second aspect, the reinforcement member extends from the rear end portion at the vehicle rear side of the battery tray along the step wall portion of the vehicle rear floor to the high floor portion. Furthermore, the reinforcement member is joined to the high floor portion. Because the reinforcement member is made to be along the step wall portion in this way, the vehicle vertical direction rigidity of the boundary portion between the low floor portion and the step wall portion can be enhanced while ensuring space for placing the battery on the low floor portion.

A vehicle rear portion structure pertaining to a third aspect is the vehicle rear portion structure pertaining to the first aspect or the second aspect, wherein a plurality of reinforcement members are placed an interval apart from each other in a vehicle width direction.

According to the vehicle rear portion structure pertaining to the third aspect, the plural reinforcement members are placed an interval apart from each other in the vehicle width direction. Because of this, the vehicle vertical direction rigidity of the boundary portion between the low floor portion and the step wall portion can be efficiently enhanced over a wide range.

As described above, according to the vehicle rear portion structure of the present disclosure, stress can be restrained from concentrating in the boundary portion between the low floor portion and the step wall portion as the vehicle rear floor vibrates in the vehicle vertical direction.

BRIEF DESCRIPTION OF THE DRAWINGS

An exemplary embodiment of the present disclosure will be described in detail based on the following figures, wherein:

FIG. 6 is a sectional view, corresponding to FIG. 2, showing a vehicle rear portion of a vehicle to which an example modification of the vehicle rear portion structure pertaining to the embodiment has been applied.

DETAILED DESCRIPTION

Figure 1:
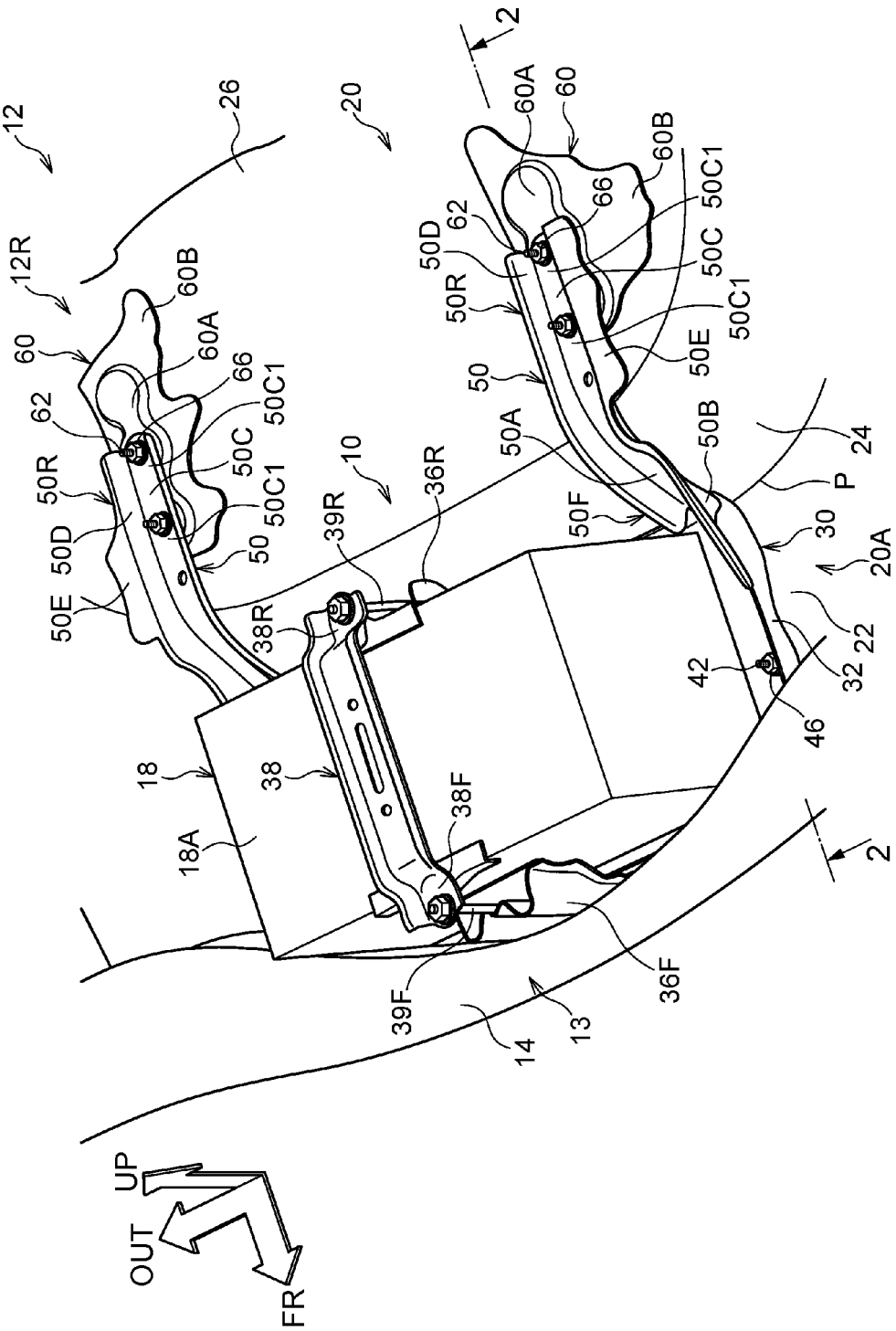
FIG. 1 is a perspective view showing a vehicle rear portion of a vehicle to which a vehicle rear portion structure pertaining to the embodiment has been applied.

A vehicle rear portion structure pertaining to an embodiment of the present disclosure will be described below with reference to the drawings. It should be noted that arrow FR appropriately shown in the drawings indicates a vehicle front side (a front side in a vehicle front-rear direction) and arrow UP indicates a vehicle upper side (an upper side in a vehicle vertical direction). Furthermore, arrow OUT indicates an outer side in a vehicle width direction. Furthermore, front/rear, upper/lower, and right/left will, unless otherwise indicated, mean front/rear in the vehicle front-rear direction, upper/lower in the vehicle vertical direction, and right/left in the vehicle width direction.

(Vehicle Rear Portion Structure)

FIG. 1 shows a vehicle rear portion 12R of a vehicle 12 to which a vehicle rear portion structure 10 pertaining to the embodiment has been applied. The vehicle rear portion structure 10 is equipped with a rear floor panel 20, a battery carrier 30, and a battery 18.

(Rear Floor Panel)

The rear floor panel 20 is made of a metal panel and forms a vehicle rear floor of the vehicle rear portion 12. The rear floor panel 20 is supported by a pair of rear side members (not shown in the drawings) placed along the vehicle front-rear direction on both vehicle width direction sides of the vehicle rear portion 12R. The rear floor panel 20 forms, for example, the floor of a luggage compartment (not shown in the drawings) formed in the vehicle rear portion 12R.

Figure 2:
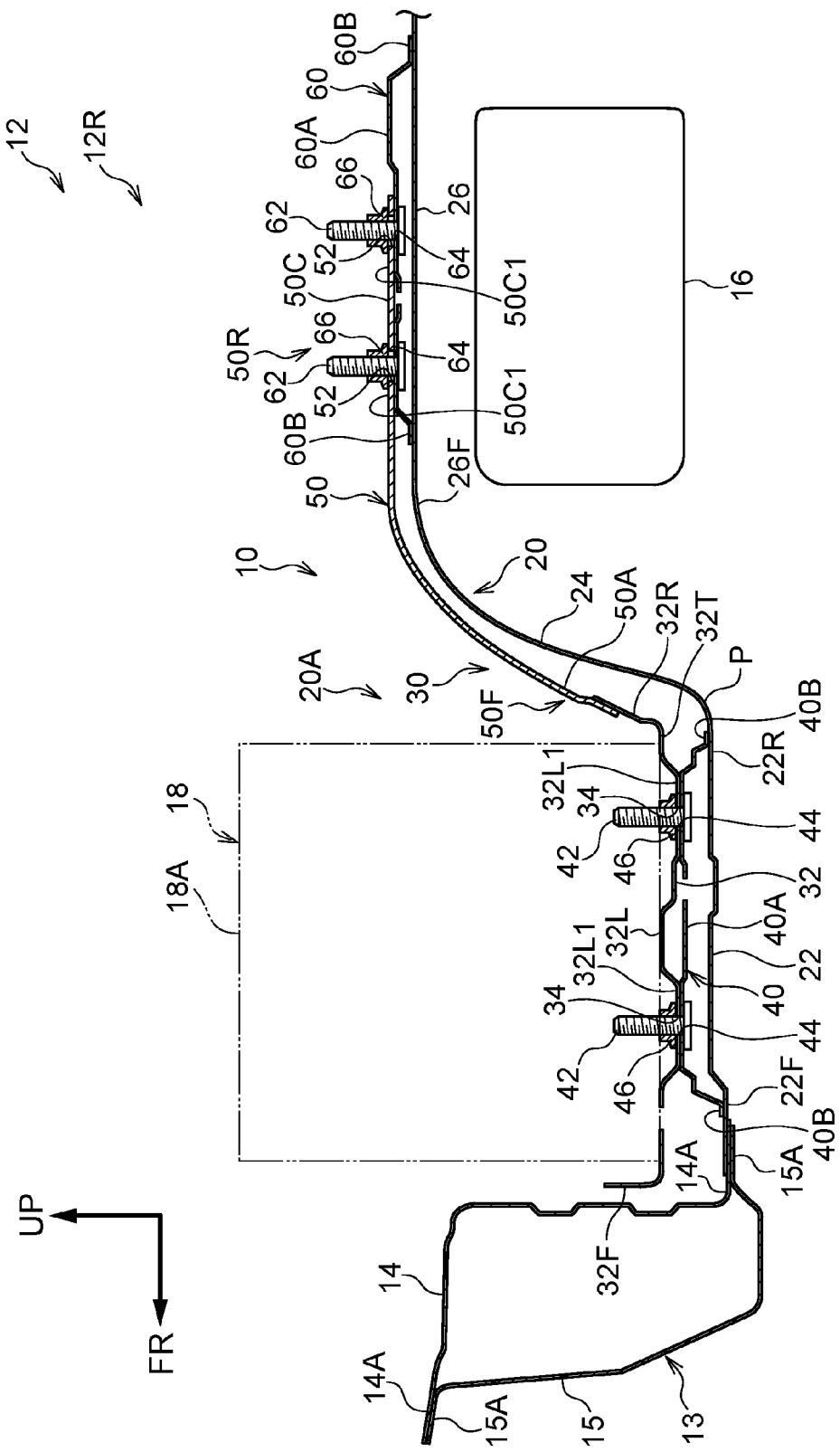
FIG. 2 is a sectional view along line 2-2 of FIG. 1.

As shown in FIG. 2, a battery housing section 20A that houses the battery 18 is formed in the vehicle width direction center portion of the rear floor panel 20. Specifically, the rear floor panel 20 has a low floor portion 22, a step wall portion 24, and a high floor portion 26. The low floor portion 22 is formed in the shape of a panel that extends in the vehicle front-rear direction and the vehicle width direction. The low floor portion 22 is placed on the vehicle rear side of a rear cross member 13 that couples together the pair of rear side members (not shown in the drawings) in the vehicle width direction. The low floor portion 22 forms a floor of the battery housing section 20A.

The rear cross member 13 has a rear cross member upper member 14 and a rear cross member lower member 15 that are divided in the vehicle vertical direction. The rear cross member upper member 14 and the rear cross member lower member 15 are joined to each other by welding, for example, at respective flange portions 14A and 15A. A front end portion 22F at the vehicle front side of the low floor portion 22 is joined by welding, for example, to the flange portions 14A and 15A at the rear side of the rear cross member 13.

The high floor portion 26 is formed in the shape of a panel that extends in the vehicle front-rear direction and the vehicle width direction. Furthermore, the high floor portion 26 is placed on the vehicle rear side and the vehicle upper side of the low floor portion 22. A fuel tank 16 is placed on the vehicle lower side of the high floor portion 26. Furthermore, the step wall portion 24, by which the high floor portion 26 is positioned on the vehicle upper side of the low floor portion 22, is formed between the low floor portion 22 and the high floor portion 26.

The step wall portion 24 is formed in the shape of a wall (the shape of a panel) that interconnects a rear end portion 22R at the vehicle rear side of the low floor portion 22 and a front end portion 26F at the vehicle front side of the high floor portion 26. The step wall portion 24 extends from the rear end portion 22R of the low floor portion 22 toward the vehicle rear side and the vehicle upper side, and is connected to the front end portion 26F of the high floor portion 26. Furthermore, the step wall portion 24 is gently curved so as to become convex toward the vehicle front side and the vehicle upper side as seen from an outer side in the vehicle width direction. Moreover, the step wall portion 24 covers the fuel tank 16 from the vehicle front side.

(Battery Carrier)

The battery carrier 30 is placed on the rear floor panel 20. The battery carrier 30 is placed ranging over the low floor portion 22 and the high floor portion 26. The battery carrier 30 has a battery tray 32, which is placed on the low floor portion 22, and a pair of reinforcement arms (reinforcement braces) 50 (see FIG. 1), which extend from the battery tray 32 along the step wall portion 24 to the high floor portion 26.

The battery tray 32 is joined via a front bracket 40 to the low floor portion 22. Specifically, the front bracket 40 has an opposing wall portion 40A, which opposes the low floor portion 22, and a flange portion 40B, which extends from the outer peripheral portion of the opposing wall portion 40A toward the vehicle lower side and is joined by welding, for example, to the low floor portion 22. Plural bolt holes 40A are formed adjacent to each other in the vehicle front-rear direction in the opposing wall portion 40A. Bolts 42 are passed through the bolt holes 44 in the vehicle vertical direction.

Figure 3:
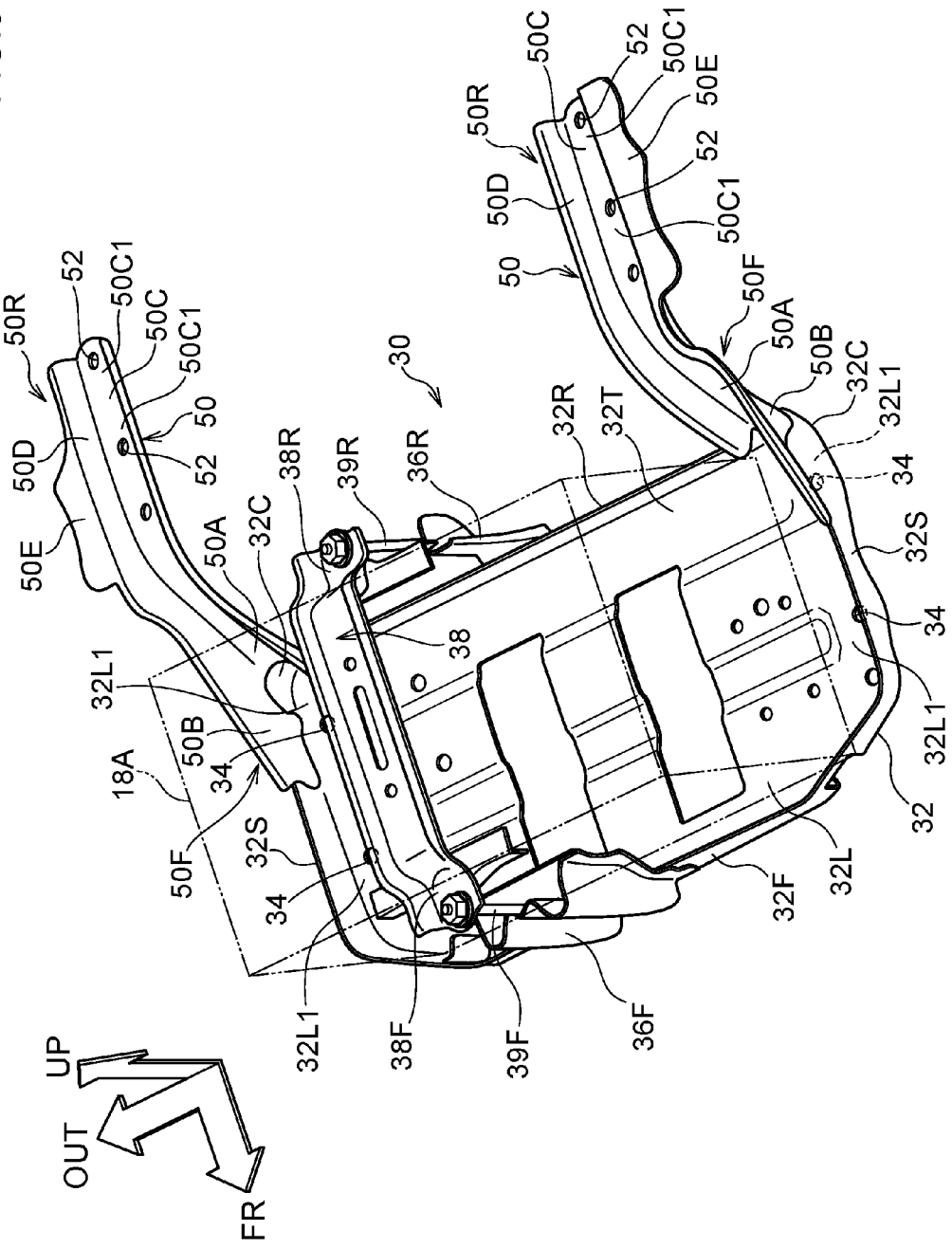
FIG. 3 is a perspective view, seen obliquely from the vehicle front side, of a battery carrier shown in FIG. 1.
Figure 4:
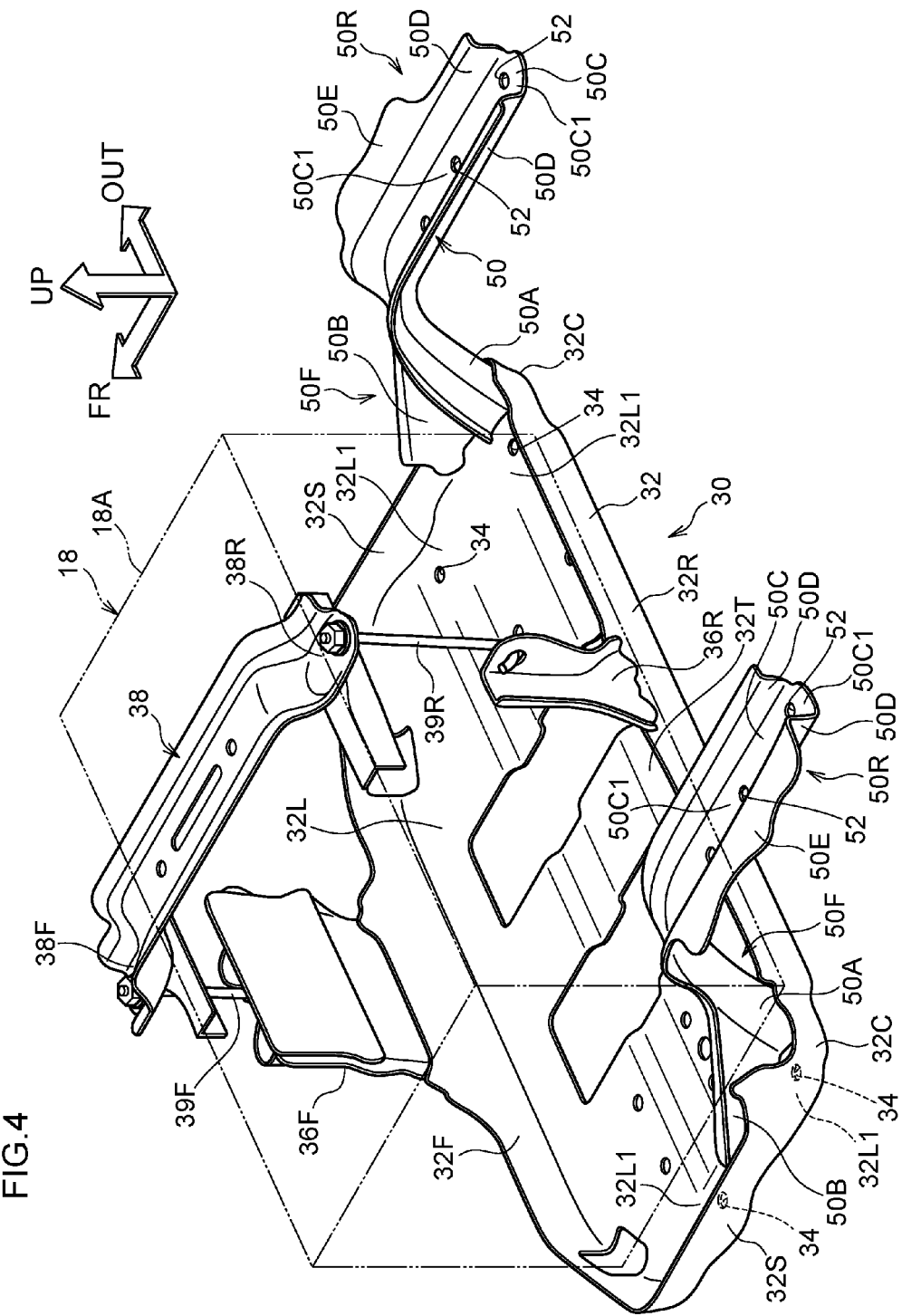
FIG. 4 is a perspective view, seen obliquely from the vehicle rear side, of the battery carrier shown in FIG. 1.

As shown in FIG. 3 and FIG. 4, the battery tray 32 has a bottom wall portion 32L, a front wall portion 32F, a rear wall portion 32R, and a pair of side wall portions 32S. The bottom wall portion 32L extends in the vehicle front-rear direction and the vehicle width direction and is formed in a rectangular shape as seen from the vehicle upper side. The front wall portion 32F extends from the front end portion of the bottom wall portion 32L toward the vehicle upper side. The rear wall portion 32R extends from the rear end portion of the bottom wall portion 32L toward the vehicle upper side. Furthermore, the pair of side wall portions 32S extend from the end portions on both vehicle width direction sides of the bottom wall portion 32L toward the vehicle upper side.

Plural joint portions 32L1 joined to the low floor portion 22 are formed adjacent to each other in the vehicle front-rear direction in regions on both vehicle width direction sides of the bottom wall portion 32L. An attachment hole 34 is formed in each joint portion 32L1. The aforementioned bolts 42 (see FIG. 2) are passed through the attachment holes 34 in the vehicle vertical direction. Additionally, as shown in FIG. 2, nuts 46 are fastened to the bolts 42 inserted into the attachment holes 34, so that the joint portions 32L1 are joined via the front bracket 40 to the low floor portion 22. It should be noted that the front bracket 40 can also be omitted. Furthermore, the method of joining the battery tray 32 to the front bracket 40 or the low floor portion 22 is not limited to the bolts 42 and the nuts 46 and may also be welding, for example.

The battery 18 is mounted on the bottom wall portion 32L. The battery 18 has a box-shaped battery case 18A. The battery 18 is a battery that supplies power to an electric motor serving as a drive source in a hybrid automobile or a battery that supplies power to an electric motor other than the drive motor. It should be noted that, rather than being a battery for a hybrid vehicle, the battery 18 may also be a battery installed in an electric automobile whose only drive source is an electric motor or a battery installed in an automobile whose only drive source is an internal combustion engine.

As shown in FIG. 3 and FIG. 4, the battery tray 32 is configured to secure the battery 18. Specifically, a front clamp base 36F is disposed on the front wall portion 32F of the battery tray 32. A rear clamp base 36R is disposed on the rear wall portion 32R of the battery tray 32. Furthermore, a clamp 38 is placed on the vehicle upper side of the battery 18.

The clamp 38 is placed along the vehicle front-rear direction at the vehicle width direction center portion of the battery 18. A front end portion 38F of the clamp 38 is coupled via a front securing rod 39F to the front clamp base 36F. Furthermore, a rear end portion 38R of the clamp 38 is coupled via a rear securing rod 39R to the rear clamp base 36R. The battery 18 (the battery case 18A) is clamped between the clamp 38 and the bottom wall portion 32L of the battery tray 32. Because of this, the battery 18 is secured to the battery tray 32.

The pair of reinforcement arms 50, which serve as a pair of reinforcement members that reinforce the rear floor panel 20, are disposed on a rear end portion 32T at the vehicle rear side of the battery tray 32. The pair of reinforcement arms 50 extend from corner portions 32C at both vehicle width direction sides of the rear end portion 32T of the battery tray 32 toward the vehicle rear side and the vehicle upper side. The pair of reinforcement arms 50 are placed an interval apart from each other in the vehicle width direction. Furthermore, the transverse sectional shape of each reinforcement arm 50 is formed in a hat shape that is open at the vehicle upper side.

A front portion 50F at the vehicle front side of each reinforcement arm 50 has a rear wall portion 50A and an outside wall portion 50B. The outside wall portion 50B extends from the vehicle width direction outer side end portion of the rear wall portion 50A toward the vehicle front side. Furthermore, the rear wall portion 50A is placed along the rear wall portion 32R of the battery tray 32 and is joined by welding, for example, to the rear wall portion 32R. Furthermore, the outside wall portion 50B is placed along the side wall portions 32S of the battery tray 32 and is joined by welding, for example, to the side wall portions 32S. The joint strength between the front portion 50F of the reinforcement arm 50 and the rear end portion 32T (the corner portion 32C) of the battery tray 32 is enhanced by the rear wall portion 50A and the outside wall portion 50B.

As shown in FIG. 2, each reinforcement arm 50 extends from the rear end side of the battery tray 32 along the step wall portion 24 toward the vehicle rear side and the vehicle upper side. Furthermore, each reinforcement arm 50 is joined via a rear bracket 60 to the high floor portion 26. A boundary portion P between the low floor portion 22 and the step wall portion 24 is reinforced by the reinforcement arms 50. Furthermore, the longitudinal direction (vehicle front-rear direction) middle portion of each reinforcement arm 50 is curved along the step wall portion 24 of the rear floor panel 20.

Each rear bracket 60 has an opposing wall portion 60A and a flange portion 60B. The opposing wall portion 60A opposes the high floor portion 26. Furthermore, plural bolt holes 64 are formed adjacent to each other in the vehicle front-rear direction at the opposing wall portion 60A. Bolts 62 are passed through the bolt holes 64 in the vehicle vertical direction. The flange portion 60B extends from the outer peripheral portion of the opposing wall portion 60A toward the vehicle lower side and is joined by welding, for example, to the high floor portion 26.

As shown in FIG. 3 and FIG. 4, a rear portion 50R at the vehicle rear side of each reinforcement arm 50 has a bottom wall portion 50C, a pair of side wall portions 50D, and a flange portion 50E. Plural joint portions 50C1 joined to the high floor portion 26 are formed adjacent to each other in the vehicle front-rear direction at the bottom wall portion 50.

The pair of side wall portions 50D extend from the end portions at both vehicle width direction sides of the bottom wall portion 50C toward the vehicle upper side. The flange portion 50E extends from the upper end portion of the vehicle width direction outer side side wall portion 50D of the pair of side wall portions 50D toward the outer side in the vehicle width direction.

An attachment hole 52 is formed at each joint portion 50C1. The aforementioned bolts 62 (see FIG. 2) are passed through the attachment holes 52 in the vehicle vertical direction. Additionally, as shown in FIG. 2, nuts 66 are fastened to the bolts 62 inserted into the attachment holes 52, so that the joint portions 50C1 are joined via the rear bracket 60 to the high floor portion 26. It should be noted that the rear bracket 60 can also be omitted. Furthermore, the method of joining the rear portion 50R of each reinforcement arm 50 to the rear bracket 60 or the high floor portion 26 is not limited to the bolts 62 and the nuts 66 and may also be welding, for example.

Next, the action of the embodiment will be described.

Figure 5:
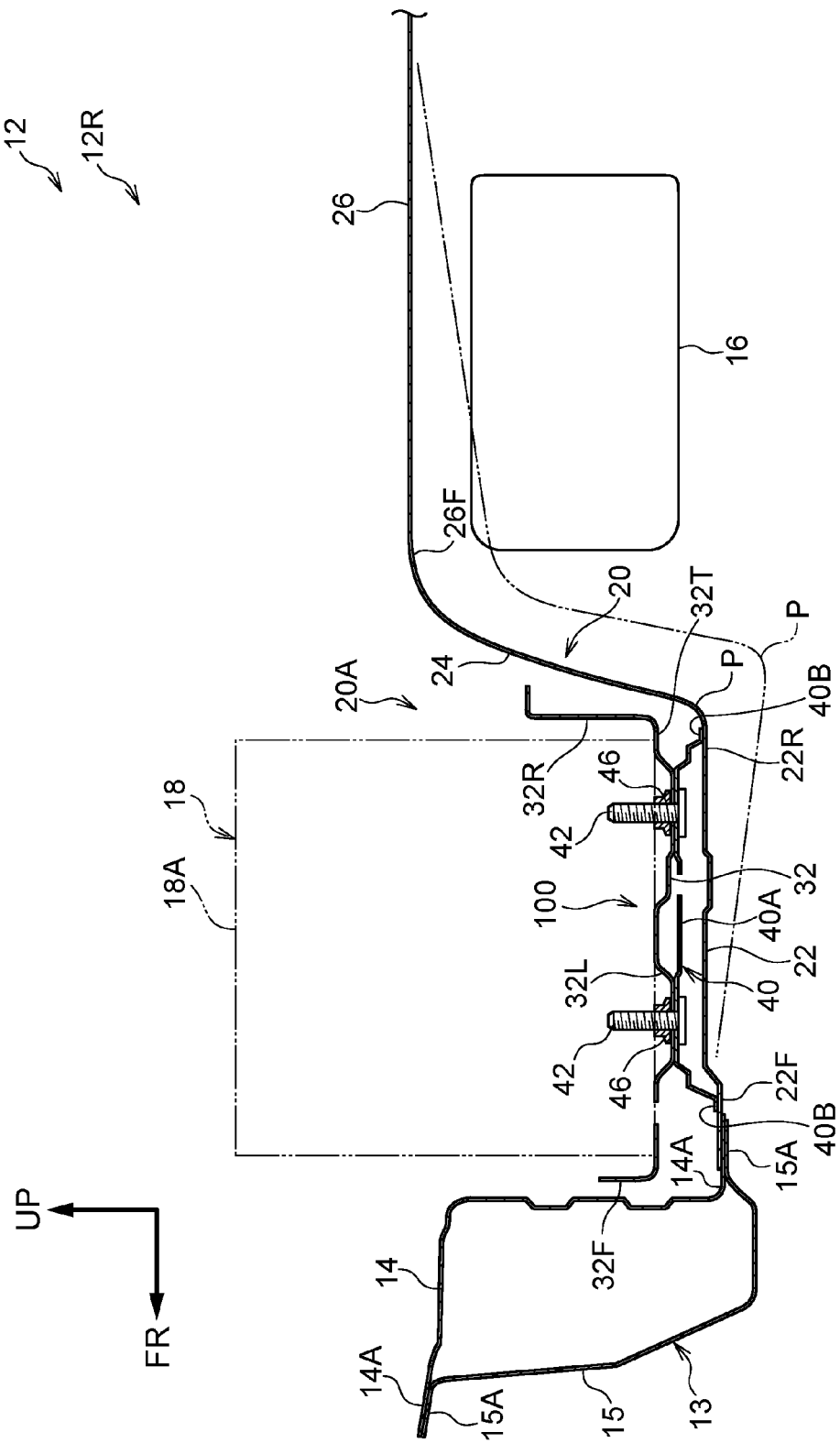
FIG. 5 is a sectional view, corresponding to FIG. 2, showing a vehicle rear portion of a vehicle in which a battery carrier pertaining to a comparative example has been installed.

First, a battery carrier pertaining to a comparative example will be described. As shown in FIG. 5, the battery carrier 100 pertaining to the comparative example is not equipped with the pair of reinforcement arms 50 of the embodiment. In this case, when the rear floor panel 20 vibrates in the vehicle vertical direction as the vehicle 12 travels, for example, the boundary portion P between the low floor portion 22 and the step wall portion 24 tends to become the antinode of the vibration as indicated by the long dashed double-short dashed line. For that reason, there is the potential for the displacement (amplitude) of the boundary portion P to become large. Additionally, when the displacement of the boundary portion P becomes large, there is the potential for stress to concentrate in the boundary portion P.

In contrast to this, the battery carrier 30 of the embodiment has the battery tray 32 and the pair of reinforcement arms 50 as shown in FIG. 2. The battery tray 32 is joined via the front bracket 40 to the low floor portion 22. The battery tray 32 supports the battery 18.

The pair of reinforcement arms 50 extend from the rear end portion 32T of the battery tray 32 along the step wall portion 24 of the rear floor panel 20 to the high floor portion 26 and are joined via the rear brackets 60 to the high floor portion 26.

Because the pair of reinforcement arms 50 that extend from the rear end portion 32T of the battery tray 32 are joined to the high floor portion 26 in this way, the vehicle vertical direction rigidity of the boundary portion P between the low floor portion 22 and the step wall portion 24 is enhanced. Because of this, in a case where the rear floor panel 20 vibrates in the vehicle vertical direction, the displacement (amplitude), in the vehicle vertical direction, of the boundary portion P between the low floor portion 22 and the step wall portion 24 is reduced. Consequently, stress can be restrained from concentrating in the boundary portion P as the rear floor panel 20 vibrates in the vehicle vertical direction.

Furthermore, the pair of reinforcement arms 50 extend from the rear end portion 32T of the battery tray 32 along the step wall portion 24 to the high floor portion 26 and are joined to the high floor portion 26. Because the pair of reinforcement arms 50 are made to follow the step wall portion 24 in this way, the vehicle vertical direction rigidity of the boundary portion P can be enhanced while ensuring space for placing the battery 18 on the low floor portion 22.

Moreover, in the embodiment, the pair of reinforcement arms 50 are disposed an interval apart from each other in the vehicle width direction at the rear end portion 32T of the battery tray 32. Because of this, the vehicle vertical direction rigidity of the boundary portion P can be efficiently enhanced over a wide range. Consequently, stress can be further restrained from concentrating in the boundary portion P as the rear floor panel 20 vibrates in the vehicle vertical direction.

Next, an example modification of the embodiment will be described.

In the embodiment, the rear floor panel 20 is reinforced by the pair of reinforcement arms 50, but the embodiment is not limited to this. For example, as shown in FIG. 6, the rear floor panel 20 may also be reinforced by a reinforcement member 80 separate from a battery carrier 70.

Specifically, the reinforcement member 80 is placed on the rear floor panel 20. The reinforcement member 80 is placed in such a way that its longitudinal direction coincides with the vehicle front-rear direction. The reinforcement member 80 is placed ranging over the low floor portion 22 and the high floor portion 26. Furthermore, a vehicle front-rear direction front portion 80F and rear portion 80R of the reinforcement member 80 are joined to the low floor portion 22 and the high floor portion 26, respectively, by welding, for example. The vehicle vertical direction rigidity of the boundary portion P between the low floor portion 22 and the step wall portion 24 is enhanced by the reinforcement member 80. It should be noted that the battery carrier 70 differs from the battery carrier 30 pertaining to the embodiment in that it is not equipped with the pair of reinforcement arms 50.

Furthermore, the battery carrier 70 is installed on the low floor portion 22. The battery carrier 70 has the battery tray 32 that supports the battery 18. The battery tray 32 is mounted on the front portion 80F of the reinforcement member 80 and is joined to the front portion 80F by the bolts 42 and the nuts 46.

It is also possible for the rear floor panel 20 to be reinforced by the reinforcement member 80 that is separate (a separate member) from the battery carrier 70 in this way. In this case, because the reinforcement member 80 can be designed separately from the battery carrier 70, the rear floor panel 20 can be efficiently reinforced by the reinforcement member 80.

Furthermore, in the embodiment, the pair of reinforcement arms 50 are disposed at the battery carrier 30, but it suffices for at least one reinforcement arm 50 to be disposed at the battery carrier 30. Furthermore, in the embodiment, the pair of reinforcement arms 50 extend from the rear end side of the battery tray 32 along the step wall portion 24 to the high floor portion 26, but it is also possible for the reinforcement arms 50 to extend toward the high floor portion 26 without being made to be along the step wall portion 24.

Furthermore, the method of joining the reinforcement arm(s) 50 to the battery carrier 30, the placement of the reinforcement arm(s) 50 with respect to the battery carrier 30, and the shape of the reinforcement arm(s) 50 can be appropriately changed. Furthermore, the reinforcement member is not limited to the reinforcement arm(s) 50, and a member capable of reinforcing the rear floor panel 20 can be used. Moreover, the shape of the battery tray 32 can also be appropriately changed.

An embodiment of the present disclosure has been described above, but the present disclosure is not limited to the embodiment. The embodiment and its various example modifications may also be appropriately combined and used, and the present disclosure can be implemented in a variety of ways without departing from the spirit thereof.

What is claimed is:

1. A vehicle rear portion structure comprising:
    a vehicle rear floor having a low floor portion, a high floor portion that is placed on a vehicle rear side and a vehicle upper side of the low floor portion, and a step wall portion that interconnects a rear end portion at the vehicle rear side of the low floor portion and a front end portion at a vehicle front side of the high floor portion;
    a battery tray that is placed on the low floor portion, is joined to the low floor portion, and is configured to support a battery; and
    a reinforcement member that extends from the battery tray to the high floor portion and is joined to the high floor portion,
    wherein the step wall portion of the vehicle rear floor is provided at the vehicle front side of a fuel tank of a vehicle having the vehicle rear portion structure.

2. The vehicle rear portion structure according to claim 1, wherein the reinforcement member extends from a rear end portion at the vehicle rear side of the battery tray along the step wall portion to the high floor portion.

3. The vehicle rear portion structure according to claim 1, wherein a plurality of the reinforcement members are placed an interval apart from each other in a vehicle width direction.

4. The vehicle rear portion structure according to claim 2, wherein the reinforcement member is disposed at corner portions of both vehicle width direction sides of the rear end portion of the battery tray.

5. The vehicle rear portion structure according to claim 1, wherein a transverse sectional shape of the reinforcement member is a hat shape that is open at the vehicle upper side.

6. The vehicle rear portion structure according to claim 1, wherein the reinforcement member is a reinforcement arm.

7. The vehicle rear portion structure according to claim 1, wherein:
    the reinforcement member extends over the low floor portion and the high floor portion, and is joined to the low floor portion and the high floor portion, and
    the battery tray is mounted on a front portion at the vehicle front side of the reinforcement member and is joined to the front portion.

8. The vehicle rear portion structure according to claim 1, wherein the battery tray is configured to secure the battery.

9. The vehicle rear portion structure according to claim 1, wherein the step wall portion extends from the rear end portion of the low floor portion toward the vehicle rear side and the vehicle upper side, and is connected to the front end portion of the high floor portion.

10. The vehicle rear portion structure according to claim 1, wherein the low floor portion has a shape of a panel that extends in a vehicle front-rear direction and a vehicle width direction.

11. The vehicle rear portion structure according to claim 1, wherein the high floor portion has a shape of a panel that extends in a vehicle front-rear direction and a vehicle width direction.

12. The vehicle rear portion structure according to claim 1, wherein the high floor portion of the vehicle rear floor is provided at the vehicle upper side of the fuel tank of the vehicle having the vehicle rear portion structure.

* * * * *